(12) United States Patent
Brunazzi et al.

(10) Patent No.: US 6,460,672 B1
(45) Date of Patent: Oct. 8, 2002

(54) SAFETY DEVICE FOR TORQUE LIMITER

(75) Inventors: Achille Brunazzi, Santa Vittoria di Gualtieri; Roberto Prospero, Verona, both of (IT)

(73) Assignee: Comer Group S.P.A., Villanova di Reggiolo (IT)

( * ) Notice: Subject to any disclaimer, the term of this patent is extended or adjusted under 35 U.S.C. 154(b) by 0 days.

(21) Appl. No.: 09/531,384

(22) Filed: Mar. 21, 2000

(30) Foreign Application Priority Data

Mar. 23, 1999 (IT) ........................... MO99A0055

(51) Int. Cl.[7] .............................................. F16D 7/04
(52) U.S. Cl. ........................................ 192/56.5; 464/37
(58) Field of Search ............................... 192/56.1, 56.5, 192/56.51; 464/37

(56) References Cited

U.S. PATENT DOCUMENTS

| | | | | |
|---|---|---|---|---|
| 1,541,489 A | * | 6/1925 | Ely | 192/56.5 |
| 1,579,057 A | * | 3/1926 | Asbury | 192/56.51 |
| 2,238,583 A | * | 4/1941 | Dodge | 464/37 X |
| 4,261,453 A | * | 4/1981 | Kunze | 192/56.51 |

FOREIGN PATENT DOCUMENTS

| | | | |
|---|---|---|---|
| DE | 37 40 490 A1 | * 6/1989 | ................. 464/37 |
| EP | 0 715 088 A1 | 6/1996 | |
| EP | 0 870 944 A1 | 10/1998 | |

* cited by examiner

Primary Examiner—Richard M. Lorence
(74) Attorney, Agent, or Firm—Wolf, Greenfield & Sacks, P.C.

(57) ABSTRACT

A safety device for a torque limiter composed of an external body, which is rigidly coupled to the driving shaft for transmitting motion to a working implement and inside which there is a seat for accommodating an internal body which is rigidly coupled to the driven motion transmission shaft and is provided with a series of radial sliding seats for corresponding tabs which can move, in contrast with elastic elements, alternatively between a centrifugal position providing engagement and transmission in corresponding slots formed in the external body and a centripetal position for disengagement from the slots and for stopping the transmission; the movement is activated by means of a corresponding centered plate which forms a protruding ring for wedging and centrifugally pushing the tabs and provides for the in-line interposition, between the internal body and the plate, of pushers for axially pushing the plate into the configuration for forced disengagement from the tabs.

14 Claims, 7 Drawing Sheets

SAFETY DEVICE FOR TORQUE LIMITER

CROSS-REFERENCE TO RELATED APPLICATIONS

This application claims priority to Italian Application Serial No. MO99A000055 filed Mar. 23, 1999, the disclosure of which is incorporated herein by reference.

BACKGROUND OF THE INVENTION

The present invention relates to a safety device for a torque limiter.

The demand to render absolutely safe every machine used in production work is becoming increasingly widespread.

This trend is also increasingly followed in the field of agricultural machines, also in order to comply with international standards.

Operators handling or using agricultural implements for tilling fields and tending to the cultivations that derive from them are in fact often involved in accidents.

Specifically, it has been found that it is increasingly necessary to provide a way to mutually disconnect the agricultural implements used by tractors and the like from the power take-offs with which these tractors are equipped.

The first and immediate form of operator protection in fact consists, in case of accident, in stopping the machines being used as quickly as possible, using devices which are activated automatically but require manual resetting in order to restore the operating conditions, consequently removing the dangerous conditions.

The prior art provides many devices for protecting the elements that potentially constitute sources of possible accidents.

However, these devices consist, in most cases, of static protections which prevent access to dangerous parts, but they do not allow dynamic intervention if these devices turn out to be ineffective and a dangerous condition arises.

SUMMARY OF THE INVENTION

The aim of the present invention is to solve the above-mentioned problems of the prior art, providing a safety device for torque limiter which allows to interrupt, in a controlled way, the transmission of motion between the power take-off and the implement, stopping its operation, when abnormal and dangerous conditions occur during work, by acting on the limiter assembly, and can be reset in an absolutely manual way when the dangerous condition ends.

This aim, this object and others are achieved by a safety device for a torque limiter composed of an external body, which is rigidly coupled to the driving shaft for transmitting motion to a working implement and inside which there is a seat for accommodating an internal body which is rigidly coupled to the driven motion transmission shaft and is provided with a series of radial sliding seats for corresponding tabs which can move, in contrast with elastic means, alternatively between a centrifugal position providing engagement and transmission in corresponding slots formed in the external body and a centripetal position for disengagement from the slots and for stopping the transmission, this movement being activated by means of a corresponding centered plate which forms a protruding ring for wedging and centrifugally pushing the tabs, characterized in that means for axially pushing the plate into the configuration for forced disengagement from the tabs are interposed between the internal body and said plate.

BRIEF DESCRIPTION OF THE DRAWINGS

Further characteristics and advantages will become apparent from the following detailed description of a preferred embodiment of a safety device for torque limiter, illustrated only by way of non-limitative example in the accompanying drawings, wherein.

DESCRIPTION OF THE PREFERRED EMBODIMENTS

Figure 2:
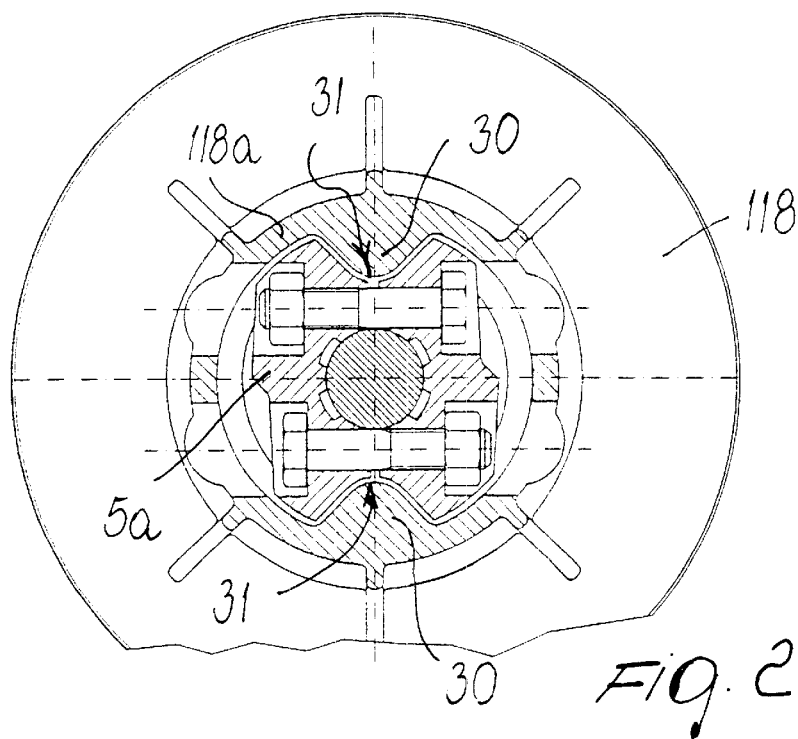
FIG. 2 is an enlarged-scale transverse sectional view, taken along the plane II—II of FIG. 3.
Figure 1:
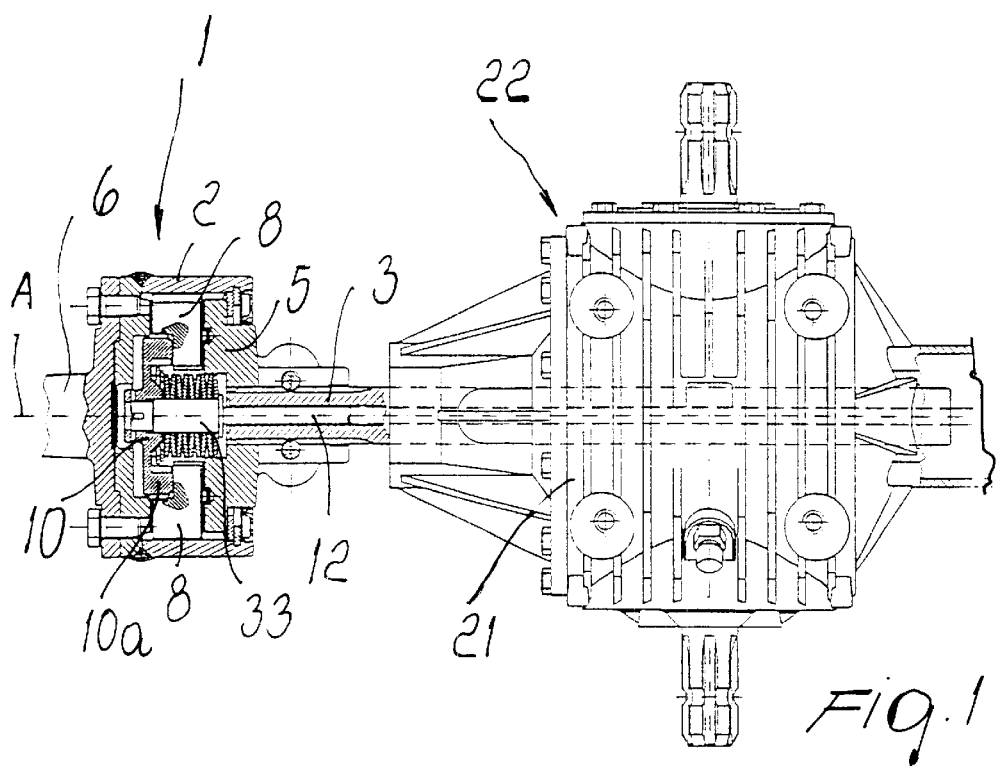
FIG. 1 is a top view of a mechanical coupling between a torque limiter and a gear casing of a power take-off of an agricultural machine.

With reference to the above figures, 1 designates a torque limiter, for power take-offs of agricultural machines in the specific case, which is composed of an external body 2 which is rigidly coupled to the driving shaft 6 for transmitting motion to a working implement (not shown for the sake of simplicity).

Inside the body 2 there is a seat 4 for accommodating an internal body 5 which is rigidly coupled to the driven shaft 3 for motion transmission and is provided with a series of seats 7 in which corresponding tabs 8 are inserted and can slide radially; these tabs can move, in contrast with elastic means 8a shown schematically, for the sake of simplicity, alternatively between a centrifugal position for engagement and transmission in corresponding slots 9 formed in the external body 2 and a centripetal position for disengagement from the slots 9 and consequently for interrupting transmission.

The centrifugal movement of the tabs 8 is activated by means of a corresponding centered plate 10 which peripherally forms, on one face, a protruding ring 10a which is adapted to wedge itself and push the tabs 8 in a centrifugal direction.

Means 11 for axially pushing the plate 10 in the configuration for forced disengagement from the tabs 8 are interposed in-line between the internal body 5 and the plate 10.

The axial pusher means 11 are constituted, in a first possible embodiment of the safety device according to the invention, by at least one pin 12 which is actuated so that it can slide axially in a corresponding seat 13 which is formed coaxially in the driven shaft 3, with corresponding actuation means 14 which are arranged in contact with one end of the pin; the opposite end of the pin 12 is coaxial and is connected b) contact with the centered plate 10.

In a second possible embodiment, the axial pusher means 11 are constituted by at least one pair of pins 112 which lie parallel and diametrically opposite to the rotation axis A of said driving shaft 6 and the driven shaft 3; the pins 112 can be actuated so as to simultaneously move axially and slide in corresponding seats 113 formed in the internal body 5 of the limiter 1 through actuation means 114 which act on the corresponding ends thereof; the opposite ends of the pins 112 are kept in contact with the centered plate 10.

In the first embodiment of the invention, the means 14 for actuating the pin 12 are constituted by a secondary pin 15 which is fitted so as to rest transversely at the end of the pin 12 that lies opposite the one in contact with the plate 10; the secondary pin 15 can slide axially in a transverse seat 16 which is formed in the driven shaft 3, and is kept in contact with means 17 which can be separated axially and are provided with elements 17*a* for locking the separated configuration.

The axially separable means 17 are constituted by two facing coaxial disks 18 and 19 which can be coupled by means of twin sets of teeth 20 which mutually interpenetrate; the sets of teeth 20 can be disengaged by contrast after turning at least one of the disks 18 or 19 with respect to the other; the first disk 18 is fitted on the driven shaft 3 so as to rotate independently of it and to freely move axially, while the second disk is rigidly coupled to the end of the conventional casing 21 that accommodates the gears constituting the power take-off 22.

The elements 17*a* for locking the separated configuration are constituted by at least one pin 23 which is supported by one of the coaxial disks, the second one 19 in the specific case, in a perpendicular seat 24 and with elastic pusher means 25, in practice a pre-compressed spring, interposed; the opposite disk 18 in turn has a hollow seat 26 which is normally rotationally offset with respect to the seat 24 and in which the pin 23 engages automatically when the first disk 18 is moved to the configuration in which it is rotated and accordingly spaced with respect to the second coaxial disk 19.

In the second possible embodiment of the invention, the actuation means 114 are constituted by a first disk 118 which is keyed on a male hub 5*a* which protrudes from the internal body 5 of the limiter 1 with centering elements 27 interposed.

The first disk 118 centrally forms a female hub 118*a* which is fitted on the male hub 5*a* and whose front surface 5*b* is kept in constant contact with the corresponding ends of the pins 112.

Moreover, the female hub 118*a* is rotationally coupled to the male hub 5*a* with corresponding means 28 having one degree of freedom and the first disk 118 can be moved axially together with a second disk 119 which faces it: friction means 29 are interposed between the first and second disks. The second disk 119 is supported and centered on the driven shaft 3 and engages, by means of a twin set of teeth which is identical to the set of teeth 20, a flange 120 which is rigidly coupled at the end of the conventional casing 21 that accommodates the gears constituting the power take-off 22.

The means 28 for coupling with one degree of freedom between the male hub 5*a* and the female hub 118*a* are constituted by two teeth 30 which protrude towards the center from the female hub 118*a* and by a corresponding pair of longitudinal grooves 31 formed radially in the male hub 5*a* ; the teeth 30 can slide parallel to the axis of the hubs in the grooves 31 for a preset extent.

The centering elements 27 are constituted by a ring 32 which is rigidly fitted at the end of the male hub 5*a* and is provided with a front resting surface 32*a* which has a concave conical profile for coupling to an opposite convex profile 118*b* that protrudes from the first disk 118.

The elements 17*a* for locking the disengaged configuration of the twin set of teeth 20, which can be deactivated manually, are fitted between the first disk 118 and the second disk 119.

The operation of the invention is described hereinafter separately for both embodiments of the invention.

Figure 3:
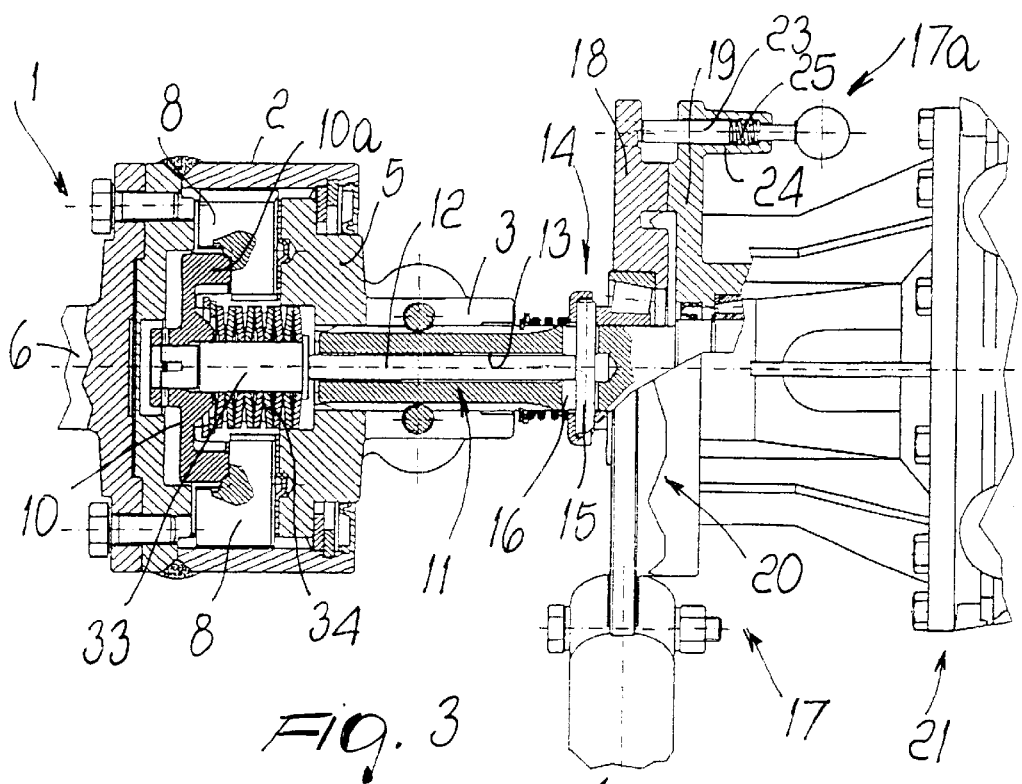
FIGS. 3 and 4 are sectional views, taken along a longitudinal plane, of a torque limiter provided with the safety device according to the invention, respectively during normal motion transmission and during intervention of the safety device.
Figure 4:
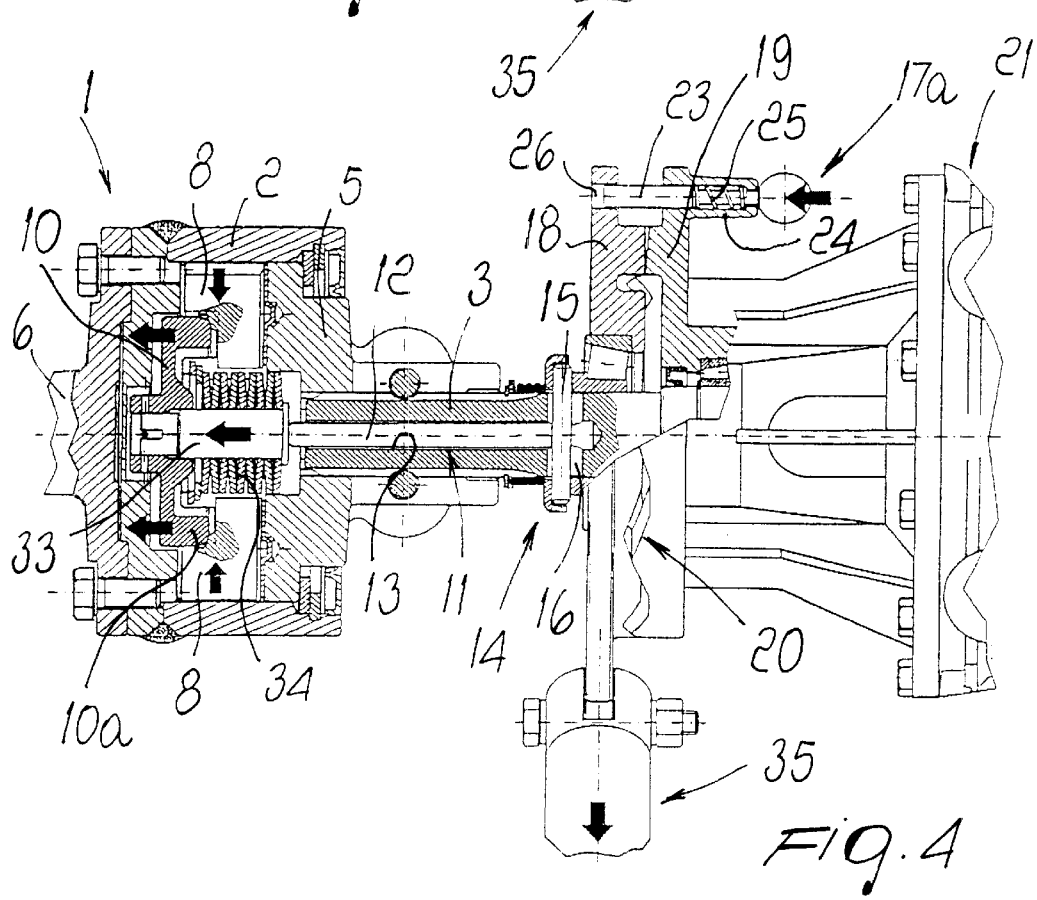
Figure 5:
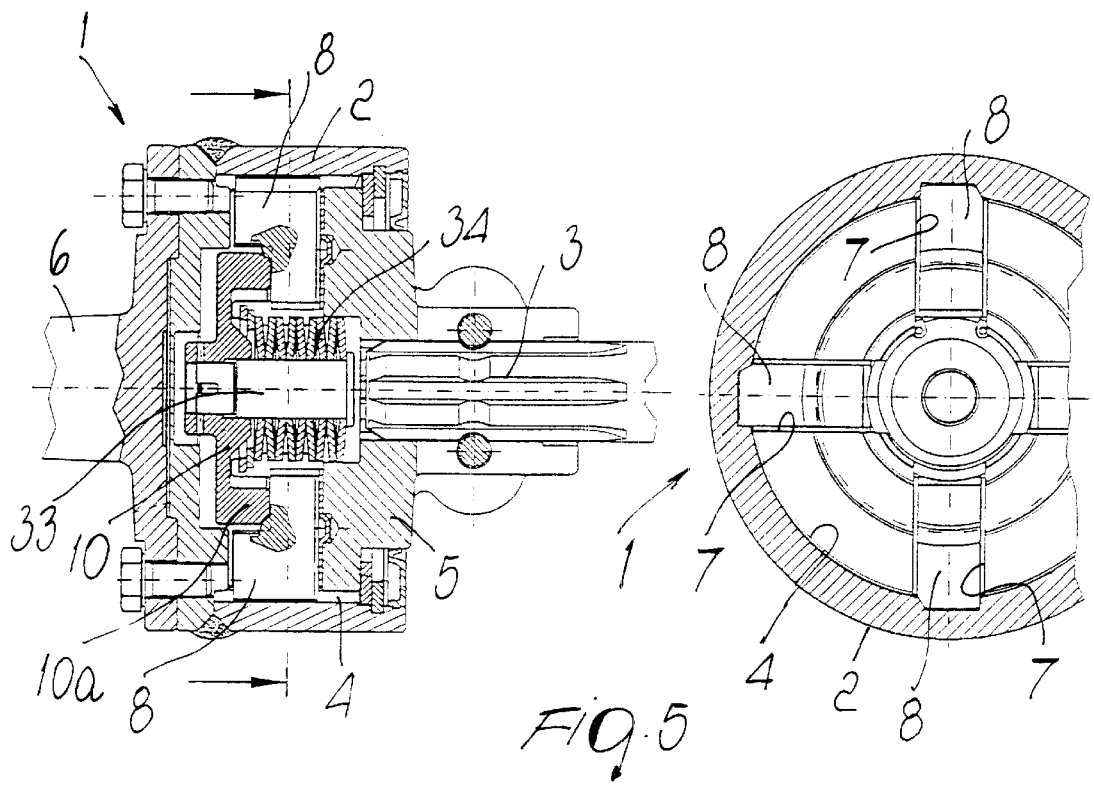
FIGS. 5A and 6A are views taken along a longitudinal plane of a conventional type of torque limiter without the safety device, shown in the motion transmission configuration.
FIGS. 5B and 6B are views taken along a transverse plane of a conventional type of torque limiter without the safety device, shown in the transmission limiting configuration.
Figure 6:
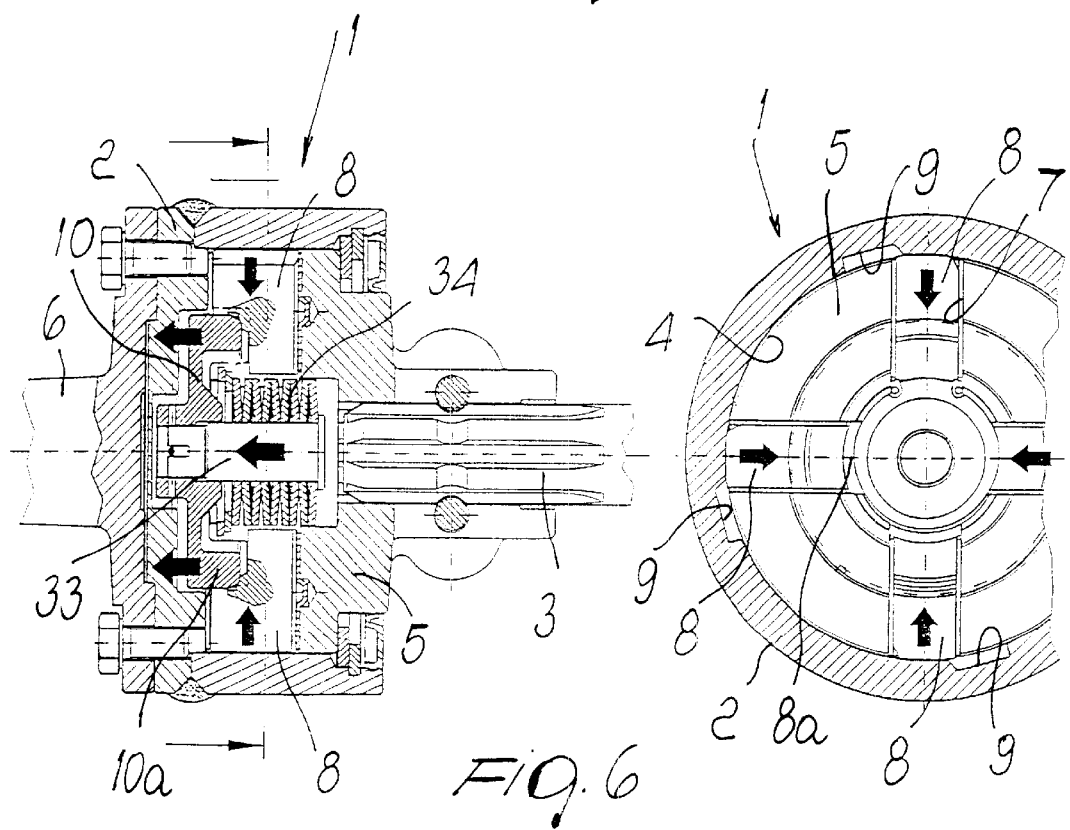
Figure 5B:
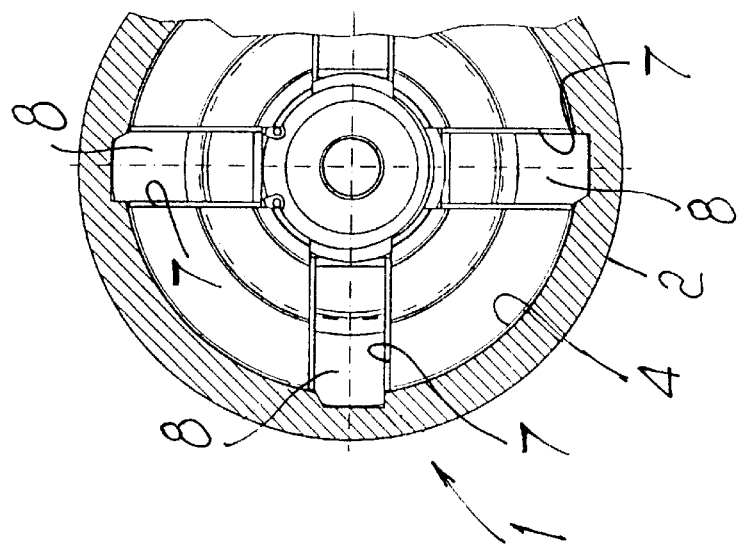
Figure 5A:
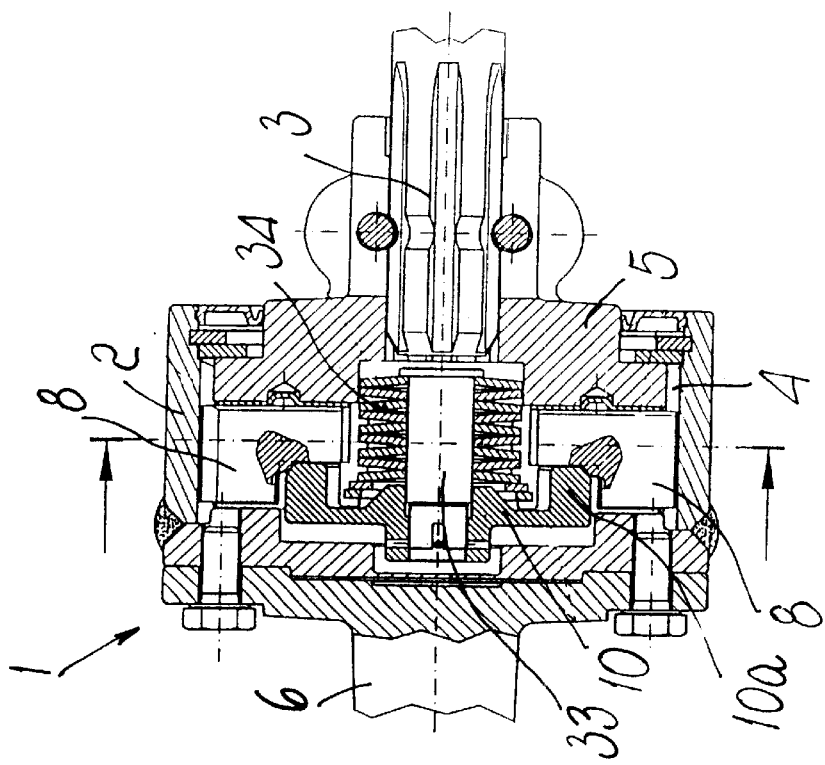
Figure 6B:
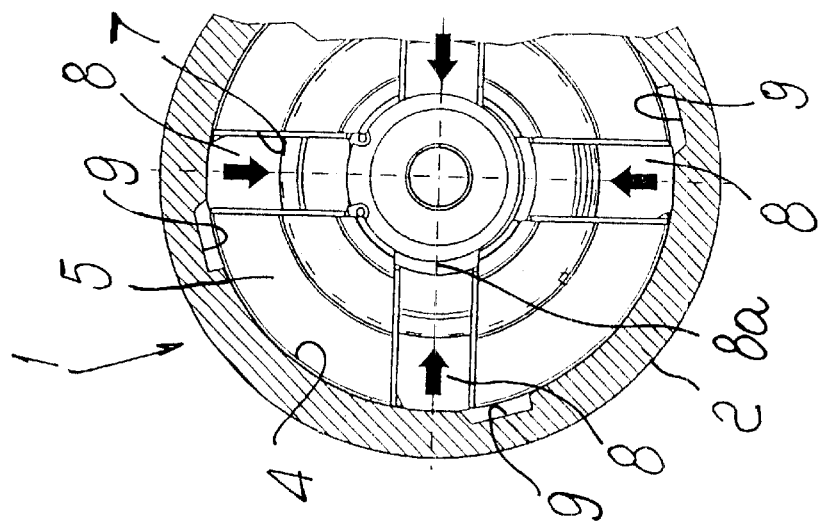
Figure 6A:
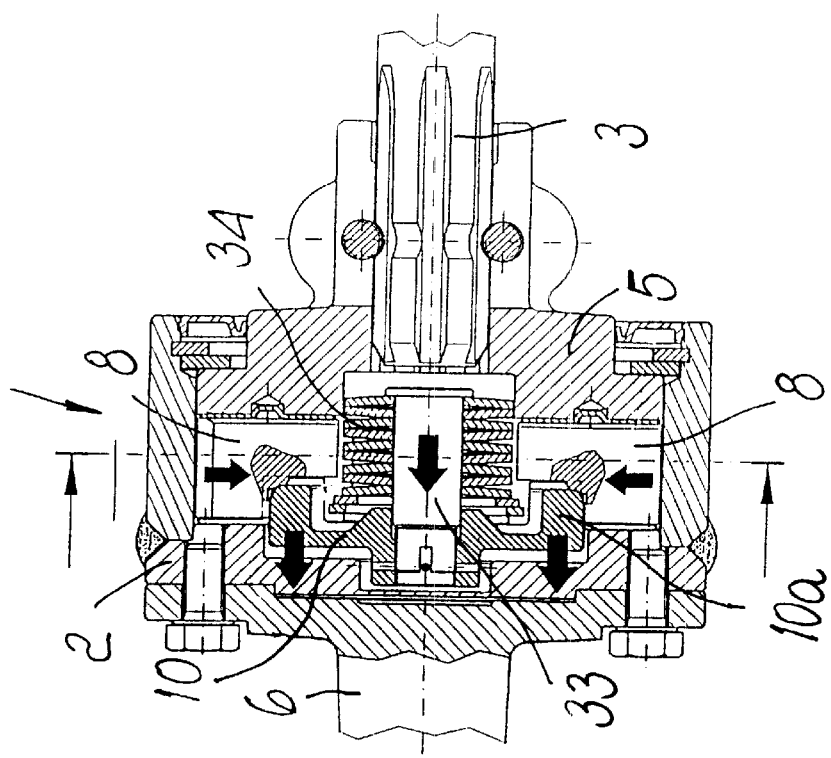

In the first embodiment, shown in FIGS. 3 and 4, the disengagement of the plate 10 is provided by moving axially the pin 12 which can slide in the seat 13 formed centrally and coaxially in the driven shaft 3.

The head of the pin 12 is in contact with the base of the stem 33, to which the pack of Belleville washers 34 is keyed and whose head is in turn in contact with the plate 10.

When the pin 12 moves to the left according to the orientation of the figures, the ring 10*a* of the plate 10 disengages from the tabs 8, which move s towards the center in the seats 7, leaving the slots 9 and thus rendering rotationally independent the external body 2, which is rigidly coupled to the driving shaft 6, and the internal body 5, which is rigidly coupled to the driven shaft 3.

In this condition, torque transmission is interrupted.

The axial actuation of the pin 12 is achieved by way of the rotation of the disk 18 with respect to the disk 19, which is rigidly coupled to the casing 21 that accommodates the gears that compose the power take-off 22.

This rotation can be activated with a conventional type of actuator 35 which can be actuated by the operator and mutually disconnects by contrast the teeth of the twin set of teeth 20, causing the disk 18 to move away from the disk 19.

In particular, the disk 18 moves towards the limiter 1, producing an equal movement in the seat 16 of the pin 15 which is fitted transversely in contact with the pin 12; this pin slides, as above-mentioned, and disengages the plate 10 from the tabs 8.

The rotation of the disk 18 with respect to the disk 19 also causes the angular alignment of the pin 24 and the seat 26; the pin 24, actuated by the pre-compressed spring 25, spontaneously engages in the seat 26 and prevents return rotations of the disk 18, keeping it spaced from the disk 19.

Only the manual intervention of an operator allows to disengage the pin 24 from the seat 26 and thus allows the disk 18 to turn in order to reengage the teeth of the twin set of teeth 20 and move to the right, with respect to the orientation of the drawings, the disk 18 and therefore the pin 12.

Figure 7:
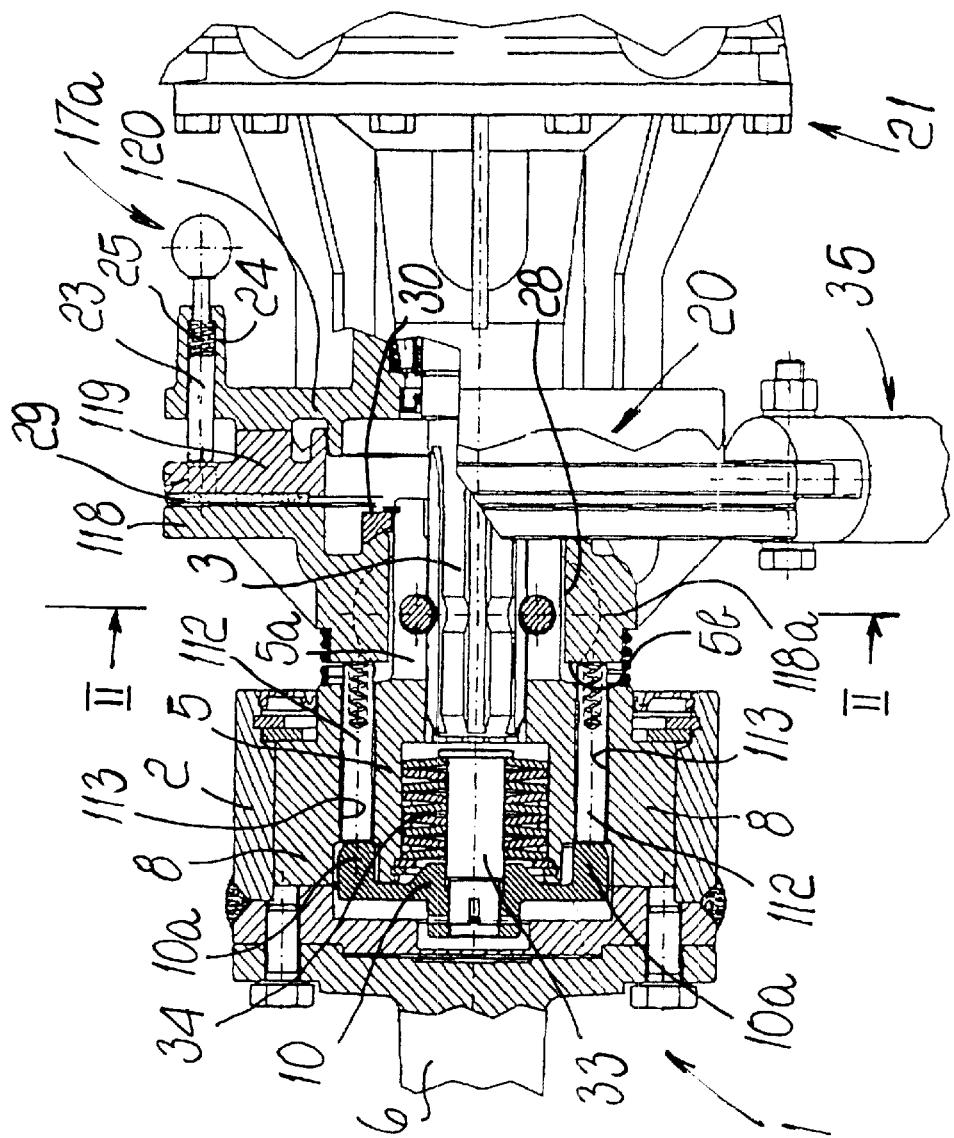
FIGS. 7 and 8 are longitudinal sectional views of a possible further second, embodiment of the safety device, shown in the normal motion transmission condition and in the intervention condition, respectively.
Figure 8:
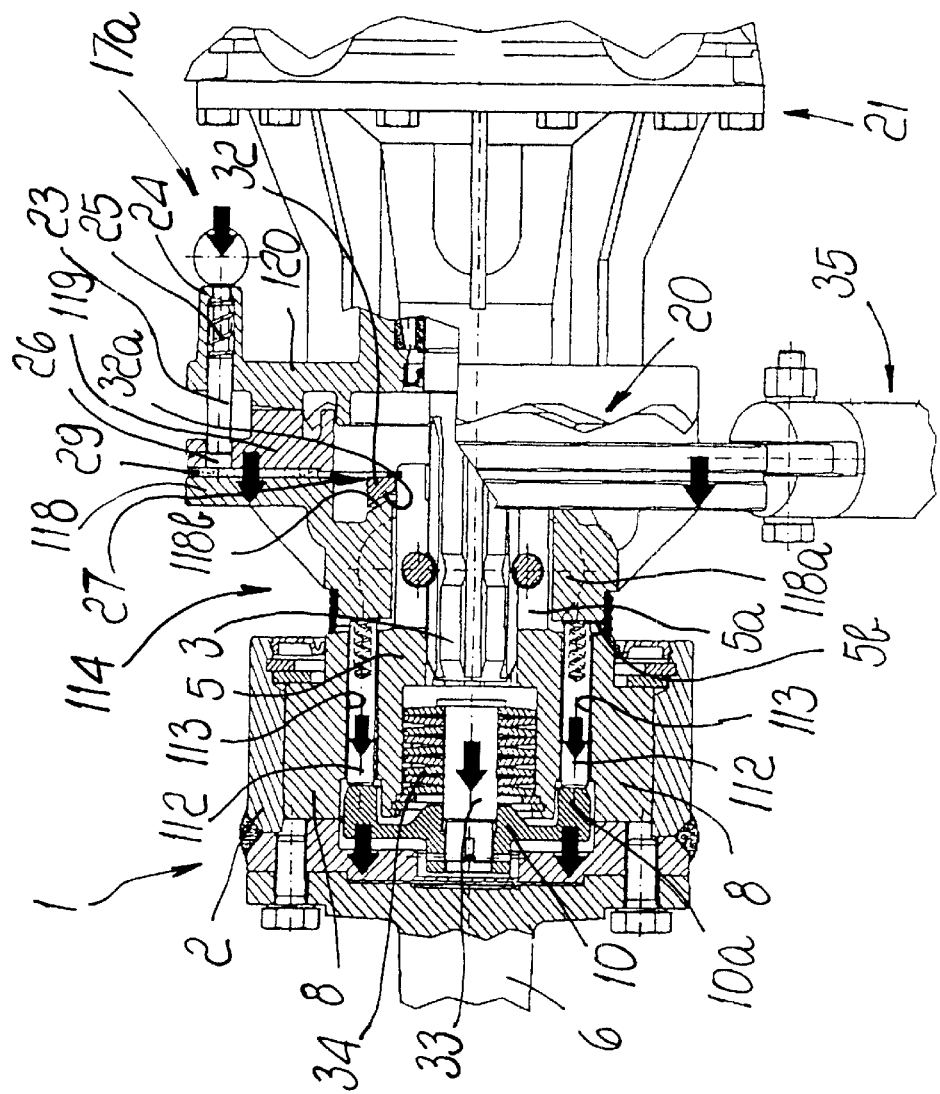

The second possible embodiment of the invention, shown in FIGS. 7 and 8, works substantially like the preceding one; the pair of pins 112 that can slide in the respective seats 113 are in fact actuated axially, and by being in contact with the ring 10*a* of the plate 10, when they move to the left with respect to the orientation of the drawings they lift it from engagement with the tabs 8, which can thus move towards the center by sliding in the seats 7 and can disengage from the slots 9, interrupting the transmission of torque in the limiter 1.

The movement of the pins 112 is activated by the female hub 118*a* of the disk 118, which moves axially on the male hub 5*a,* which is pushed by the mutual disengagement of the teeth of the twin set of teeth 20, interposed between the second disk 119 and the flange 120.

A gasket of friction material, for example brake lining, can optionally be inserted between the two disks 118 and 119 and brakes the rotation of the driven shaft 3 with respect to the driving shaft 6 when it is disengaged therefrom.

As in the previously described embodiment, the rotation of the disks 118 and 119 with respect to the flange 120, which is rigidly fitted at the end of the casing 21, causes the angular alignment of the seat 26, which in this case is formed in the second disk 119, with the pin 23, which engages in it automatically, actuated by the spring 25, thus keeping fixed the torque transmission interruption configuration.

In this second embodiment of the invention also, in order to restore the normal transmission conditions it is necessary for an operator to manually act by disengaging the pin 23 from the seat 26.

In this manner, the disk 118 can retract together with the disk 119, moving to the right with respect to the drawings, and the pins 112 stop pushing against the plate 10, which can thus reengage between the tabs 8 and restore the torque transmission condition.

In practice it has been observed that the above-described invention achieved the intended aim.

The invention thus conceived is susceptible of numerous modifications and variations, all of which are within the scope of the inventive concept.

All the details may further be replaced with other technically equivalent ones.

In practice, the materials employed, as well as the shapes and the dimensions, may be any according to requirements without thereby abandoning the scope of the protection of the appended claims.

The disclosures in Italian Patent Application No. MO99A000055 from which this application claims priority are incorporated herein by reference.

What is claimed is:

1. A safety device for a torque limiter, said torque limiter having:
    a driven motion transmission shaft;
    a driving shaft for transmitting motion to a working implement;
    an external body rigidly coupled to said driving shaft and including locking slots;
    a seat provided in said external body;
    an internal body, accommodated in said seat, said internal body being rigidly coupled to the driven motion transmission shaft and being provided with a series of radial sliding seats; elastic means provided in said sliding seats;
    tabs movable in said sliding seats, against a biasing force exerted by said elastic means, alternatively between a centrifugal position providing engagement and transmission in said locking slots formed in said external body and a centripetal position for disengagement from said locking slots and for stopping the transmission;
    a centered plate which forms a protruding ring for wedging and centrifugally pushing said tabs, movement of said tabs being activated by way of said centered plate;
    the safety device, comprising:
        pusher means for axially pushing said centered plate into a configuration for forced disengagement from said tabs, said pusher means being interposed between said internal body and said centered plate; and
        actuation means which are controllably actuatable to act on said pusher means for axially pushing said centered plate into said configuration for forced disengagement from said tabs.

2. The safety device of claim 1, wherein said axial pusher means comprise at least one pin and a corresponding seat, said pin being actuated so as to slide axially in said seat, and said actuation means being placed in contact with a first end of said pin, while a second, opposite end thereof being connected coaxially in contact with said centered plate.

3. The safety device of claim 2, wherein said seat, in which said pin is sliding, is formed in said driven transmission shaft,coaxially thereto.

4. The safety device of claim 1, wherein said axial pusher means comprise at least one pair of pins and corresponding seats, said pins being arranged parallel to a common rotation axis of said driving and driven shaft, being diametrically opposite, and being actuatable simultaneously with an axial sliding motion in said seats formed in said internal body of the limiter by way of said actuation means which act on corresponding ends thereof, opposite ends of said pins being kept in contact with said centered plate.

5. The safety device of claim 2, comprising axially separable means and locking elements for locking said separable means in a separated configuration, and wherein said actuation means for actuating said pin comprise a secondary pin, a transverse seat formed in said driven shaft which is fitted transversely so as to rest on the first end of said pin that lies opposite the second one for contact with said plate, said secondary pin being slideable axially in the transverse seat and being kept in contact with said separable means, and an actuator for controlled, operator actuation of the actuation means.

6. The safety device of claim 5, wherein said axially separable means comprise two coaxial disks which face each other, and twin sets of teeth, said disks being coupleable to said sets of teeth so as to disengage by contrast between the teeth upon moving at least one of said disks with respect to the other one, a first disk being fitted on said driven shaft so as to be able to rotate independently and move axially, a second disk, being rigidly coupled to an end of a conventional gear casing including a power take-off.

7. The safety device of claim 6, wherein said locking elements comprise at least one pin which is supported by one of said coaxial disks; a perpendicular seat, for said pin; elastic pusher means interposed between said pin and said one coaxial disk; and a rotationally offset hollow seat, provided at the second, opposite one of said disks, for automatic engagement of said pin in a rotated and separated configuration of said two coaxial disks.

8. The safety device of claim 7, wherein said pin is disengageable from said seat, manually, in order to restore torque transmission conditions.

9. The safety device of claim 5, wherein said actuation means comprise:
    a male hub which protrudes from said internal body of the limiter;
    a first disk which is keyed on said male hub;
    a second disk facing said first disk;
    a female hub arranged centrally to said first disk, said female hub being fitted onto said male hub and having a front surface which is kept in constant contact with said first end of said at least one pin; coupling means for rotationally coupling to said male hub said female hub, said coupling means having one degree of freedom, and said first disk being supported on said driven shaft so as to be centered thereon and axially moveable by contact with said second disk;
    friction means interposed between said first and second disks;

a fixed flange which is mounted at the end of a gear power take-off casing; and engagement means, provided at said second disk, for engaging said fixed flange.

10. The safety device of claim 9, wherein said coupling means comprise two teeth which protrude radially from said female hub, and a corresponding pair of longitudinal grooves which are formed radially in said male hub, said teeth being slideable parallel to an axis of the hubs in said grooves by a preset extent.

11. The safety device of claim 9, wherein said engagement means comprise a twin set of teeth with interpenetrating front teeth.

12. The safety device of claim 9, wherein said centering elements comprise a ring, which is fixed in a fixed configuration to an end of said male hub and is provided with a front resting surface which has a concave-conical profile, and an opposite convex profile which protrudes from said first disk, said concave and convey profiles being coupleable to each other.

13. The safety device of claim 11, wherein said locking elements are fitted between said second disk and said flange.

14. A torque limiter comprising:
- a driven motion transmission shaft;
- a driving shaft for transmitting motion to a working implement;
- an external body rigidly coupled to said driving shaft and including locking slots;
- a seat provided in said external body;
- an internal body, accommodated in said seat, said internal body being rigidly coupled to the driven motion transmission shaft and being provided with a series of radial sliding seats; elastic means provided in said sliding seats;
- tabs movable in said sliding seats, against a biasing force exerted by said elastic means, alternatively between a centrifugal position providing engagement and transmission in said locking slots formed in said external body and a centripetal position for disengagement from said locking slots and for stopping the transmission;
- a centered plate which forms a protruding ring for wedging and centrifugally pushing said tabs, movement of said tabs being activated by way of said centered plate;
- a safety device comprising:
  - pusher means for axially pushing said centered plate into a configuration for forced disengagement from said tabs, said pusher means being interposed between said internal body and said centered plate; and
  - actuation means which are controllably actuatable by an operator to act on said pusher means for axially pushing said centered plate into said configuration for forced disengagement from said tabs.

* * * * *